Inventors
A. H. W. BECK-
A. B. CUTTING
By *R. P. Morris*
Attorney

United States Patent Office 2,737,631
Patented Mar. 6, 1956

2,737,631

CAVITY RESONATORS

Arnold Hugh William Beck and Alan Butler Cutting, London, England, assignors to International Standard Electric Corporation, New York, N. Y., a corporation of Delaware Application May 3, 1951, Serial No. 224,432

Claims priority, application Great Britain May 9, 1950

4 Claims. (Cl. 333—83)

The present invention relates to tuning arrangements for electromagnetic-wave cavity-resonators. It is common practice to adjust the tuning of cavity resonators by alterations of the volume enclosed by the bounding conducting surfaces. When the shape of such a resonator is simple and the connections thereto allow of its use, the resonator is frequently tuned by means of a piston which alters the volume available for electromagnetic oscillations within the cavity by effectively short-circuiting a portion thereof; either a contacting or a non-contacting piston acting as a wave filter may be used. In general, such arrangements are not simple to manufacture, and, as an alternative a portion of a wall of the resonator may be made flexible or conducting screw plugs may be inserted through the walls to reduce the contained volume. These methods, and in particular the last mentioned, are not satisfactory for tuning over wide frequency bands.

It is the purpose of the present invention to provide an improved tuning arrangement for cavity resonators which is capable of varying the resonance frequency over a wide range.

It has previously been proposed to tune a cylindrical resonator by means of a spring of conducting material in the form of a strip which bears against, or is secured to, a wall of the resonator at the ends so as normally to lie against it, but which can be deflected into the body of the resonator by means of a plunger acting against the spring, the strip then short-circuiting a portion of the resonator volume. The arrangements heretofore proposed for this method of tuning were either such as would permit only restricted ranges of movement or they tended to introduce large and variable resistive losses at the ends of the strip.

In accordance with the present invention, there is provided a tuning arrangement for an electromagnetic wave cavity resonator comprising a pair of rotatable pillars mounted in a wall thereof with their axes parallel to the direction of current flow therein, a flexible strip supported at its ends in respective longitudinal slots in the said pillars so as to be free to slide therein, the strip being made of conducting material or having such material secured thereto, the position of the strip determining the effective volume of the said resonator, and means for adjusting the said position to tune the resonator.

The invention will be described with reference to the accompanying drawings in which.

Figure 1:
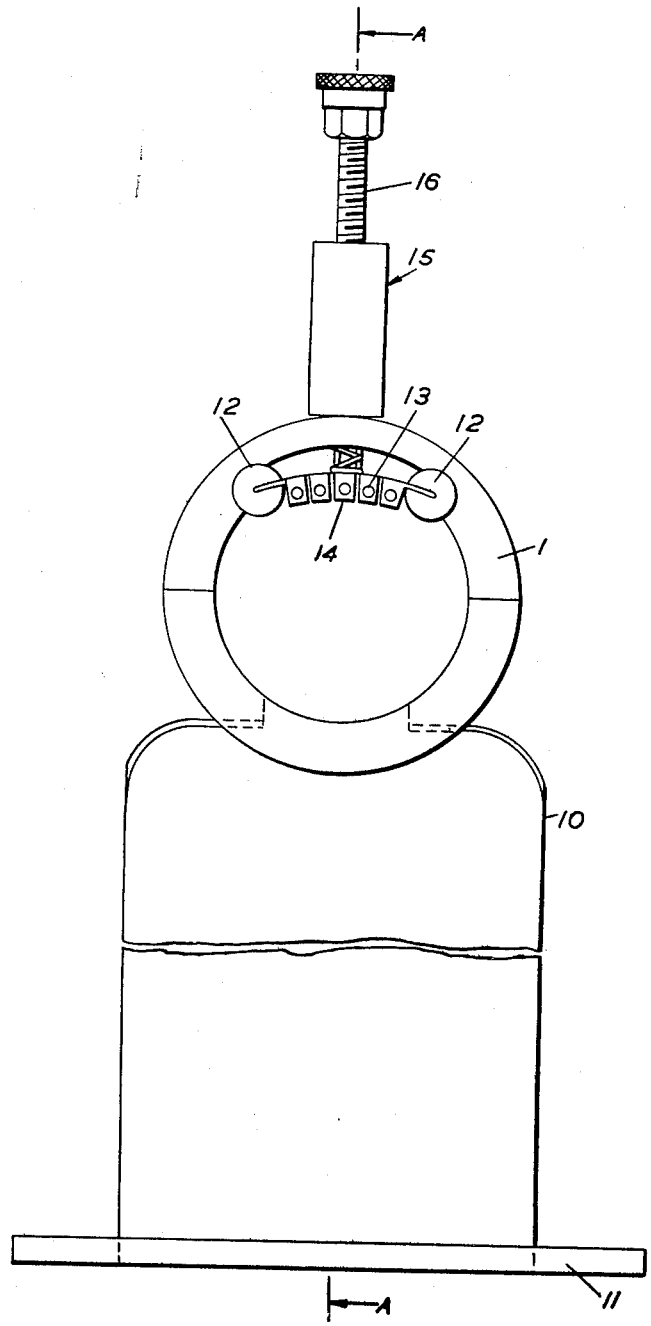
Fig. 1 shows part of a cylindrical resonator, suitable for use with a reflex electron velocity modulation oscillator forming an integral part of the resonator, and having tuning arrangements according to the present invention.
Figure 2:
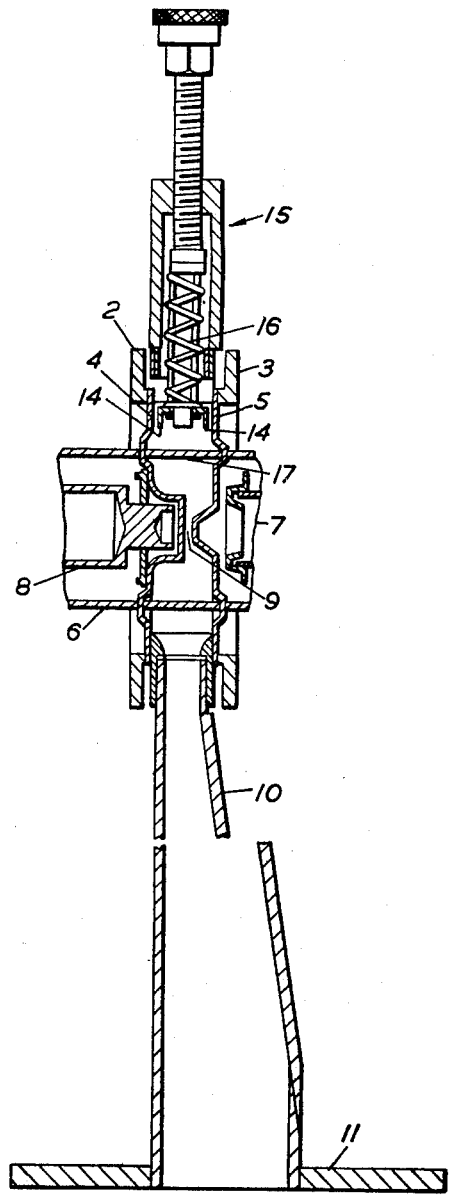
Fig. 2 shows a side view of the resonator portion of Fig. 1 with the valve in place to complete the resonator and, Fig. 3 shows another embodiment of the invention, having two symmetrical tuning arrangements for use with an oscillator operating at the third harmonic of the fundamental frequency of the resonator.

In each of the embodiments the resonator is of the cylindrical type having end plates formed by discs sealed through the envelope of the electron discharge device, the discs being clamped to a ring 1 by means of cover plates 2 and 3 (Fig. 2), the discs being indicated by reference numerals 4 and 5. In Fig. 2 part of the valve itself is shown including a portion of the glass envelope 6, the cathode 7 and reflector electrode 8, the discs 4 and 5 forming an inter-action gap 9 between them in which the electron beam from cathode 7 interacts with the electromagnetic field of the resonator. A portion of the side wall of ring 1 is slotted and communicates with a tapered wave guide 10 which is integral with ring 1. The tapered section 10 terminates in a flange 11 whereby the oscillator may be clamped to a rectangular wave guide and be matched in impedance thereto.

In accordance with the invention the tuning arrangement comprises a pair of rotatable pillars 12 mounted in the wall of the resonator formed by the ring 1 and having their axes parallel to the direction of current flow in that wall portion. A flexible strip 13 is supported in longitudinal slots in the pillars 12, in such manner that the ends are free to move within the slots, and in the embodiments shown carries serrated edge portions 14 which are bent over so as to make contact between the two end plates of the resonator formed by the discs 4 and 5. It has been found that a strip of beryllium copper spring having integral serrated edges 14 provides satisfactory contact with the resonator walls.

The spring strip is of such length that normally it will tend to lie against the cylindrical wall of the resonator. For the purpose of adjusting the position of the strip and hence tuning the resonator, a screw plunger mechanism 15 is mounted on the ring 1 with the plunger 16 joined to the strip 13. The limit of movement of the strip towards the middle of the resonator is fixed by the glass envelope portion 17 (Fig. 2) within the resonator. The arrangement of the invention enables a large change of volume to be obtained so that a wider range of mechanical tuning is available than would be possible with conventional screw plugs. In an oscillator designed for use in the band around seven centimeters wave-length, it has been found possible to obtain a tuning range over more than ±5% of the mid-frequency.

Figure 3:
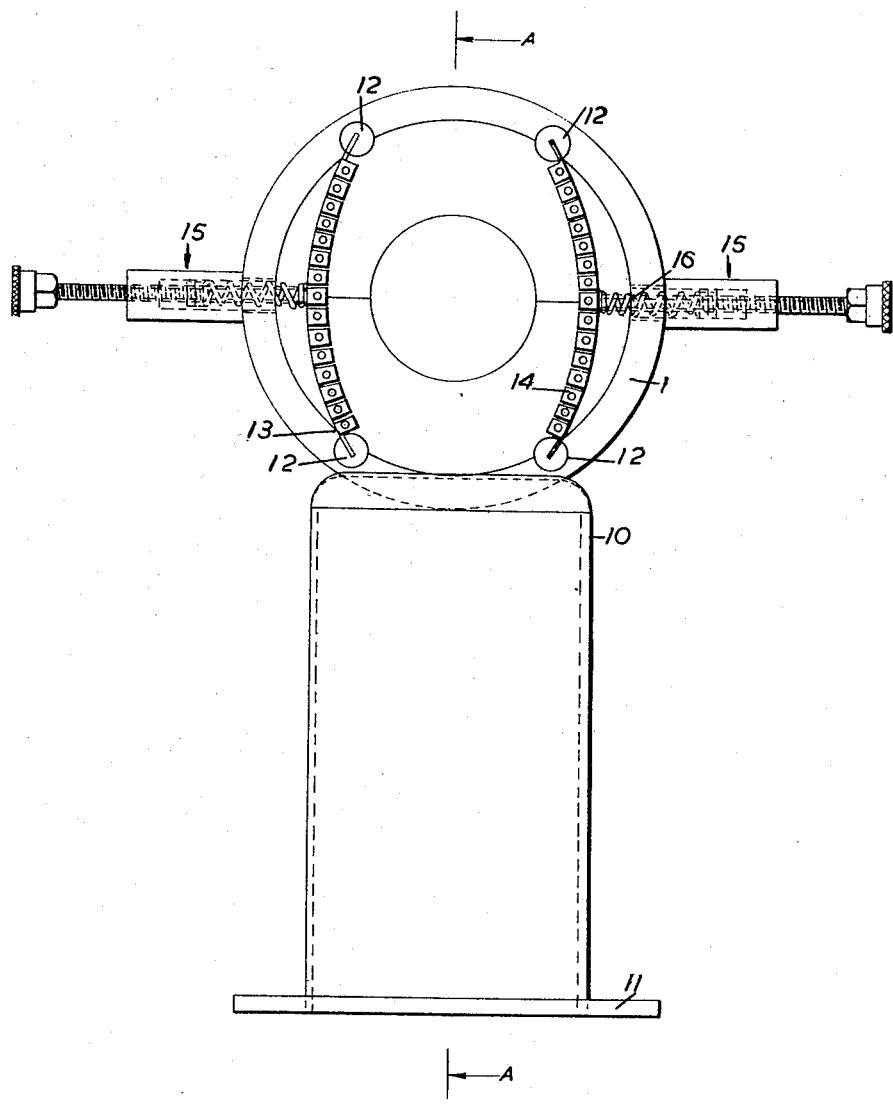

The arrangement according to the invention has been found to be very satisfactory for use in an oscillator designed to generate oscillations at the third harmonic of the fundamental resonator frequency. In this case, as is shown in Fig. 3, in order to avoid undue distortion of the electromagnetic field pattern in the neighborhood of the inter-action gap, two tuning arrangements are provided, one on either side of the electron stream.

While the principles of the invention have been described above in connection with the specific embodiments, it is to be clearly understood that this description is made only by way of example and not as a limitation on the scope of the invention; thus the invention is applicable to rectangular cavity resonators in place of conventional piston tuning arrangements, being simpler to construct and more reliable in operation than the conventional system. Again just as the conventional piston tuner may be of the non-contact variety, using filter technique, so it is not essential that contact be made between the edges of the strip of the present invention and the end walls of the resonator providing the resonator dimensions permit these edges being shaped to provide a high frequency choke between the strip and the adjacent resonator walls.

What is claimed is:

1. A tunable cavity resonator, comprising a wall defining said cavity, a pair of rollers rotatably mounted in said wall, a flexible strip having a conductive surface, means connecting said strip at its respective ends to said rollers, the conductive surface facing the axis of said resonator, and means for varying the effective volume of said resonator by flexing said strip.

2. A tuning arrangement according to claim 1, wherein said resonator is cylindrical in form and in which the said strip is provided with serrated edge portions of spring material making contact with respective opposite end faces of the resonator.

3. A tuning arrangement according to claim 1 in which the said strip is of spring material of such length that it tends to lie against the wall of the resonator whereby the effective resonator volume is a maximum, and wherein said means for varying the resonator volume comprises a plunger which passes through the resonator wall and is joined to the strip to deflect it away from the said wall.

4. A cavity resonator according to claim 1 comprising a pair of flexible strips symmetrically located on either side of said resonator.

References Cited in the file of this patent

UNITED STATES PATENTS

| | | |
|---|---|---|
| 2,410,109 | Schelleng | Oct. 29, 1946 |
| 2,474,688 | Pease | June 28, 1949 |
| 2,487,619 | Usselman | Nov. 8, 1949 |
| 2,500,637 | Kinzer | Mar. 14, 1950 |
| 2,551,672 | Harris | May 8, 1951 |

FOREIGN PATENTS

| | | |
|---|---|---|
| 583,501 | Great Britain | Dec. 19, 1946 |